US009289924B2

(12) United States Patent
Behns et al.

(10) Patent No.: US 9,289,924 B2
(45) Date of Patent: Mar. 22, 2016

(54) PRESS

(71) Applicant: Fette Compacting GmbH, Schwarzenbek (DE)

(72) Inventors: Holger Behns, Barsbüttel (DE); Thomas Pannewitz, Klein Pampau (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 0 days.

(21) Appl. No.: 14/352,876

(22) PCT Filed: Oct. 15, 2012

(86) PCT No.: PCT/EP2012/004304
§ 371 (c)(1),
(2) Date: Apr. 18, 2014

(87) PCT Pub. No.: WO2013/056805
PCT Pub. Date: Apr. 25, 2013

(65) Prior Publication Data
US 2014/0287078 A1    Sep. 25, 2014

(30) Foreign Application Priority Data

Oct. 21, 2011 (DE) .......................... 10 2011 116 552

(51) Int. Cl.
| | | |
|---|---|---|
| *B22F 3/00* | (2006.01) | |
| *B29C 43/00* | (2006.01) | |
| *B30B 1/18* | (2006.01) | |
| *B30B 1/32* | (2006.01) | |
| *B30B 11/02* | (2006.01) | |
| *B30B 15/02* | (2006.01) | |
| *B30B 15/04* | (2006.01) | |

(52) U.S. Cl.
CPC .............. *B29C 43/006* (2013.01); *B30B 1/181* (2013.01); *B30B 1/32* (2013.01); *B30B 11/02* (2013.01); *B30B 15/028* (2013.01); *B30B 15/04* (2013.01); *B30B 15/041* (2013.01)

(58) Field of Classification Search
CPC ........ B29C 43/006; B30B 1/181; B30B 1/32; B30B 11/02; B30B 15/028; B30B 15/04; B30B 15/041
USPC .......................................................... 425/78
See application file for complete search history.

(56) References Cited

U.S. PATENT DOCUMENTS 8,668,483 B2    3/2014   Mercado et al.

FOREIGN PATENT DOCUMENTS

| CH | WO2011/045303 | * 4/2011 | ................ B22F 3/03 |
|---|---|---|---|
| DE | 43 36 744 A1 | 5/1995 | |

(Continued)

*Primary Examiner* — Joseph S Del Sole
*Assistant Examiner* — John Robitaille
(74) *Attorney, Agent, or Firm* — Vidas Arrett & Steinkraus

(57) ABSTRACT

A press for producing a pellet from powdered material, comprising a press frame with an upper and a lower retaining plate, which are connected to one another by several vertical spacers and with at least one supporting element, which is disposed between the upper and the lower retaining plate, a tool guiding unit with at least one upper punch unit with at least one upper press punch and/or at least one lower punch unit with at least one lower press punch and with a die assembly with at least one holder for powdered material, which is to be pressed by the upper and/or lower press punch, wherein the tool guiding unit is disposed at the supporting element, and at least one upper drive unit for moving the upper punch unit in the vertical direction and/or at least one lower drive unit for moving the lower punch unit and or the die assembly in the vertical direction, wherein, when the press is operating, the upper drive unit and/or the lower drive unit are supported at the supporting element in such a manner, that the reaction forces, which are produced during the pressing of the powdered material in the at least one holder, are generated as action forces, are passed into the supporting element.

23 Claims, 1 Drawing Sheet

(56) References Cited

FOREIGN PATENT DOCUMENTS

| EP | 1 952 975 A1 | 8/2008 |
| EP | 2 149 450 A2 | 2/2010 |
| EP | 2 311 587 A1 | 4/2011 |
| JP | 2001 025 897 A | 1/2001 |
| JP | 2004 314 118 A | 11/2004 |
| JP | 2010234379 A | 10/2010 |
| WO | 2008104969 A1 | 9/2008 |

* cited by examiner

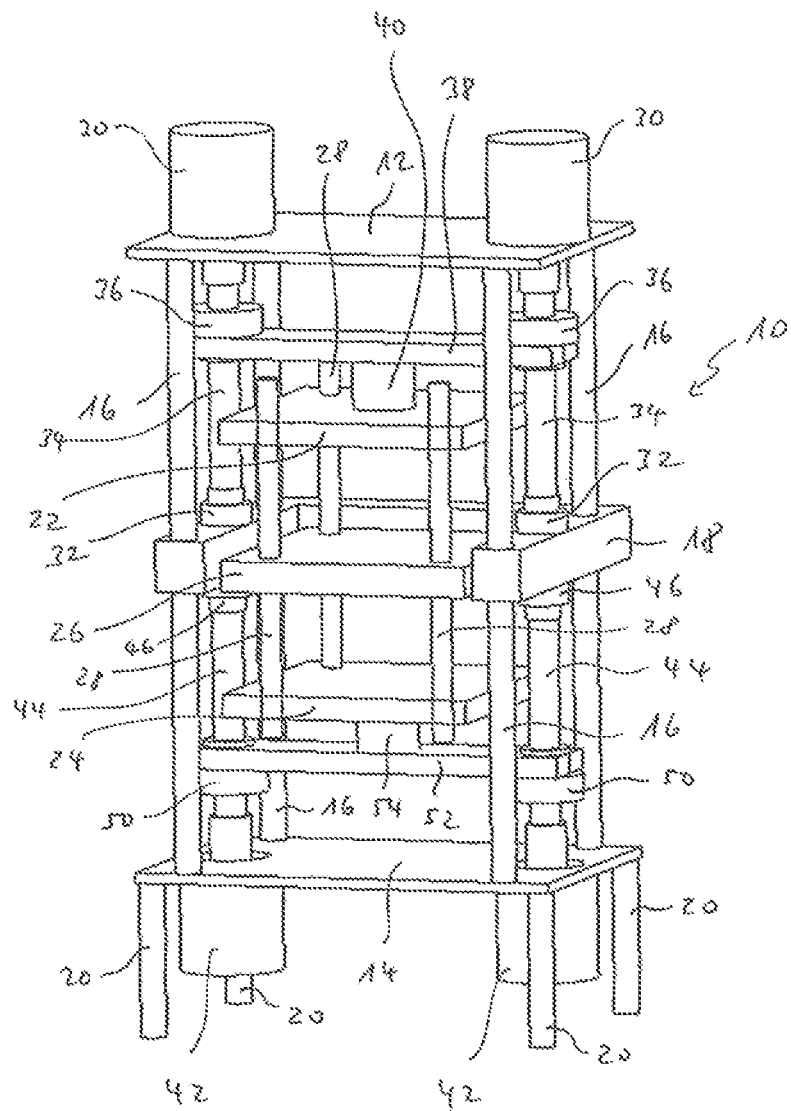

PRESS

CROSS-REFERENCE TO RELATED APPLICATIONS

This application is a U.S. National Stage application which claims priority to PCT/EP2012/004304, filed on Oct. 15, 2012, which claims priority to DE 10 2011 116 552.9, filed Oct. 21, 2011, the contents of which are hereby incorporated by reference.

BACKGROUND OF THE INVENTION

The invention relates to a press for producing a pellet from a powdered material, for example, a metal or ceramic powder. The powdered material is filled into a mold holder of a die assembly and subsequently pressed into a pellet in the mold holder by an upper punch and a lower punch. One such a press is known, for example, from EP 2 311 587 A1. The known press has a press frame with an upper and a lower part of the press and vertical pillars, which connect the upper and lower parts of the press with one another. As precise an alignment as possible of all components in the force flux during the pressing process is of decisive importance for the result of pressing with such presses and for the wear of the press. For the known press, a plurality of components, which are usually produced individually, and component levels are in the flux of the force. As a result, the manufacturing tolerances add up and, because of the high forces of the press, components of the press may become deformed. In particular, it is possible that the axes of the upper and lower drive units, which drive the upper and lower punch, are not aligned with one another precisely. Consequently, the pressing result may be defective. In order to minimize the effects on the pressing result, it has been proposed that so-called tool guiding units be used, which comprise the upper and lower punches, as well as a die plate with a mold holder. If the tool guiding units are dimensioned adequately, the effect of deforming the press components on the pellet is negligible. However, this leads to a considerable additional expense with regard to the tool guiding units. In addition, during the pressing, there is increased wear of individual components, such as seals and guiding tapes of cylinders in the case of hydraulic presses, spindles and spindle nut units in the case of spindle presses or guides of the tool guiding units.

A further press is known from the WO 2008/104969 A1. This press has a frame-like press frame, for which an upper and a lower frame plate are connected with one another over several struts at the edge, which are oriented parallel to a longitudinal axis of the press frame and are connected with one another. Between the upper and the lower frame plate, a die plate, which is aligned perpendicularly to the longitudinal axis and in which there is a holder for pressing a powdered material, is fixed to the press frame. A pair of guiding rods, which are oriented in the direction of the longitudinal axis and are securely mounted in the press frame at a distance from one another in the upper and lower region thereof, penetrate the die plate as well as a press arrangement, which is disposed above and below the die plate, provided for accommodating and moving a press punch and can be moved on the guide rods. Each of the two threaded rods, which are anchored securely at a distance from one another in the die plate, engages an assigned threaded nut, which is mounted rotatably in the upper and the lower press arrangement, the two upper and the two lower ones being driven by a motor carried by the assigned press arrangement.

The upper and the lower press arrangement can be moved in the vertical direction over the spindle drives, which are fastened to the die plate and which, synchronized in pairs, are driven by the in each case one motor. Accordingly, the motors for operating the spindle drives are moved along correspondingly with each vertical movement of the press arrangement. The pressing force, which functions as an action force and is to be applied at the upper and lower press punch whenever the powdered material is pressed, generates a reaction force, which is absorbed over the threaded rods, which are fixed in pairs above and below to the die plate, and discharged into the die plate. This construction requires considerable dimensioning of the die plate and also of the respective press arrangement, in order to absorb the forces and moments occurring in the course of the pressing and in the course of the hereby occurring movement of the upper and lower press arrangement. In addition, for exchanging the press arrangements with their press punches, the press must be largely dismantled, no information being provided about the exchangeability of the holder of the powdered material in the die plate.

Starting out from the prior art explained above, the invention is based on the objective of making available a press of the type named above, with which, in a structurally simple manner, an optimum pressing result is achieved and, at the same time, an exchange of the components of the press in a simple manner is possible.

BRIEF SUMMARY OF THE INVENTION

The invention accomplishes this objective by a press for producing a pellet from a powdered material, comprising a press frame with an upper and a lower retaining plate, which are connected to one another by several vertical spacers, and with at least one supporting element, disposed between the upper and the lower retaining plate, furthermore comprising a tool guiding unit with at least one upper punch unit with at least one upper press punch and/or with at least one lower punch unit with at least one lower press punch and with a die assembly with at least one holder for powdered material, which is to be pressed by the upper and/or lower press punch, wherein the tool guiding unit is disposed at the supporting element, and furthermore comprising at least one upper drive unit for moving the upper punch unit in the vertical direction and/or at least one lower drive unit for moving the lower punch unit and/or the die assembly in the vertical direction, wherein the upper drive unit and/or the lower drive unit are supported at the supporting element during the operation of the press, such that the reaction forces, which are generated by the pressing forces, produced during the pressing of the powdered material in the at least one holder, are generated as action forces, are passed into the supporting element.

The inventive press has a press frame with an upper and a lower retaining plate, which are connected by vertical spacers and thus form a frame or a housing of the press. The press stands by way of the lower retaining plate by means of feet or directly on the ground. The press furthermore comprises a tool-guiding unit, in particular a tool-guiding frame. This tool-guiding frame has one or more upper and/or lower punch unit or units with, in each case, at least one upper and/or lower punch. Moreover, the tool guiding unit has a die assembly with a mold holder, into which the powder, which is to be pressed, is filled before it is pressed by the press punch or punches. The powdered material may, for example, be a metal or a ceramic powder. The die assembly is disposed, in particular, between the upper and lower punch units. Usually, the press comprises at least one upper and one lower punch, which interact in the holder of the die assembly for pressing the powder, which has been charged. It is, however, basically also conceivable to press, for example, only from above with only one upper punch, if the holder of the die assembly has a closed bottom.

The die assembly may have a die plate. Likewise, the upper and/or the lower punch unit or units may have an upper or a lower punch plate. An aligning unit for the tool guiding unit may be provided, with which the latter may be aligned relative to the supporting element while being inserted in the press frame. Upper and/or lower drive units are provided for moving the upper and/or lower punches vertically in the course of the pressing. Basically, is possible to provide more than one, for example two, upper drive units and more than one, for example two, lower drive units. If two upper drive units and/or two lower drive units are provided, these may be disposed, for example, symmetrically on two mutually opposite sides of the press frame. It is, however, also conceivable to provide a drive unit only on one side and to have a guide unit on the opposite side. As explained, the lower drive unit can drive a lower punch unit or a die assembly in the vertical direction. The press can therefore be operated by the ejection method, for which the die assembly is stationary, and the upper and lower punches are moved relative to the die assembly as well as by the withdrawal method, for which the lower punch is stationary and the die assembly as well as the upper punch are moved. Basically, the number of press axes and, with that, the pellets produced in parallel can be increased within wide limits.

The press frame of the inventive press has a supporting element, which is disposed between the retaining plates. The supporting element may be disposed, for example, essentially in the middle between the retaining plates. The supporting element is formed separately from the die assembly or a die plate of the die assembly and can absorb large forces. According to the invention, the tool guiding unit is disposed at the supporting element. In addition, in accordance with the invention, the upper drive unit and/or the lower drive unit, when the press is in operation, are supported at the supporting element, in particular directly and, moreover, in such a manner, that the reaction forces, which are generated as action forces by the pressing forces produced during the pressing of the powdered material in the at least one mold holder, are passed at least predominately into the supporting element. In the course of a pressing procedure, the upper and lower punches exert a considerable pressing force, produced by the upper and/or lower drive unit, on the powdered material, which is to be pressed into a pellet. This pressing force, as an action force, produces a reaction force or counter force, which, in turn, acts over the upper and lower punches on the upper and/or lower drive unit. In accordance with the invention, this reaction force, which is introduced by the upper and lower punches into the upper and/or lower drive unit, is thus passed into the supporting element. The remaining parts of the press frame, in particular the vertical spacers between the retaining plates, essentially, do not participate in this force flux. These forces are also not passed once again over the upper and/or lower drive unit into the die assembly. In particular, the inventive press frame is a press frame without pillars, for which the vertical spacers do not have to be designed for absorbing high pressing forces. Since the force essentially does not flow over the comparatively long pillars of a press frame, the frame spring of the press is less. Any deformation of the press frame and the therewith associated undesirable effects on the results of the pressing are largely avoided. Moreover, advantageously, only a few components of the press are in the force flux. As a result, only a few component tolerances are cumulative. The components, which are in the flux flow in accordance with the invention, in particular the carrying frame, can be manufactured constructively in a less expensive manner with low tolerances. A precise pressing result can therefore be achieved at a lower cost than with the prior art. Moreover, the total height of the press is low, since the drive units can be integrated in the frame of the press.

The die assembly and the supporting element of the press frame can be disposed in the same or in a slightly spaced apart location plane. The location plane, in particular, is a horizontal plane. The die assembly, in particular a die plate, as well as the supporting element usually extend in a direction perpendicular to the location plane, in particular in a vertical direction. The location plane can then, for example, be located centrally with respect to the vertical extent of the die assembly, in particular of the die plate or the supporting element. In the case of this configuration, the mounting level of the die assembly, in particular a die plate can be largely identical with the mounting level of the respective drive unit at the supporting element, if a plane, oriented perpendicularly to the axis of rotation of, for example, a spindle nut system of the drive unit, is defined as the mounting plane. By these means, deformations of components of the press, while the latter is in operation, are avoided further. The die assembly, in particular a die plate, may be fastened to the support element, in particular directly. By these means, deformation of the components of the press is decreased further.

According to a further development, the upper drive unit and/or the lower drive unit can be fastened to the supporting element, in particular directly. Furthermore, it is possible that the upper drive unit is disposed between the supporting element at the upper punch unit and/or the lower drive unit is disposed between the supporting element and the lower punch unit or the die assembly. The upper drive unit can be fastened directly or by way of an upper transfer element to the upper punch unit and/or the lower drive unit can be fastened directly or by way of a lower transfer element to the lower punch unit or the die assembly.

According to a further development, the upper transfer element may comprise an upper transfer bridge and/or the lower transfer element may comprise a lower transfer bridge. It is then furthermore possible that two upper drive units are provided, which are fastened to the upper transfer bridge, and/or that two lower drive units are provided, which are fastened to the lower transfer bridge. By providing two drive units per press axis, the dimensions of the respective drive units can be smaller. The two drive units, which are assigned to one axis of the press, can be operated in opposite directions with the objective that the reaction torques which are generated by the two driving moments of the drives, compensate one another and, accordingly, do not bring about any deformations in the arrangement, which takes up the drives. An effect, which is compensatory in this respect, is achieved if the threaded spindles of the oppositely operated drives have opposite lead angles (right-handed and left-handed threads). Furthermore, an upper force transfer element may be disposed between the upper transfer bridge and the upper punch unit and/or between the lower transfer bridge and the lower punch unit or the die assembly.

According to a further development, the upper drive unit may comprise at least one upper spindle drive, which is driven by at least one electric motor. Alternatively, or in addition, the lower drive unit may comprise at least one lower spindle drive, which is driven by at least one electric motor. Particularly high forces can be transferred precisely with spindle drives. At least one electric motor of the upper spindle drive can be fastened to the upper retaining plate of the press frame.

Correspondingly, at least one electric motor of the lower spindle drive can be fastened to the lower retaining plate of the press frame. This has the advantage that the motors are not moved during a pressing process and, with that, there are no weight forces. The comparatively high weight of the motors then does not lead to undesirable stresses on the assigned drive units and, with that, on the punch units, these stresses being taken up by the press frame instead. Of course, the motors do not have to be fastened to the retaining plates.

In accordance with a further development, an upper fixed bearing of an upper spindle of at least one upper spindle drive can be fastened to the supporting element and an upper spindle nut of the at least one upper spindle drive can be fastened directly or over an upper transfer element to the upper punch unit. Alternatively or in addition, a lower fixed bearing of a lower spindle of a lower spindle drive can be fastened to the supporting element and a lower spindle nut of the at least one lower spindle drive can be fastened directly or over a lower transfer element to the lower punch unit and/or the die assembly. The upper or lower transfer element may, for example, be an upper or lower transfer bridge. In the case of drive units with rotating spindles, the latter can be mounted with their fixed bearings (particularly directly) at the supporting element. Spindle nuts, mounted on the spindles, may then preferably be connected with one another over transfer bridges. In turn, the transfer bridges can then be connected with the tool guiding unit, in particular with an upper or lower punch unit or a die assembly. The drive units can also be connected directly to the punch units or the die assembly. Likewise, a direct connection of the respective transfer bridge to the punch units or the die assembly without a force transfer element is conceivable.

The electric motor may be a hollow shaft motor. It is then possible that the hollow shaft motor is fastened to the supporting element and that the hollow shaft motor drives an upper spindle nut of the at least one upper spindle drive, wherein an upper spindle of the at least one upper spindle drive is fastened directly or over an upper transfer element to the upper punch unit, and/or that the hollow shaft motor drives a lower spindle nut of the at least one lower spindle drive, wherein a lower spindle of the at least one lower spindle drive is fastened directly or over a lower transfer element to the lower punch unit and/or the die assembly. It is furthermore possible that the hollow shaft motor is fastened directly or over an upper transfer element to the upper punch unit and drives an upper spindle nut of the at least one upper spindle drive, and that an upper spindle of the at least one upper spindle drive is fastened to the supporting element and/or that the hollow shaft motor is fastened directly or over a lower transfer element to the lower punch unit and or the die assembly and drives a lower spindle nut of the at least one lower spindle drive, and that a lower spindle of the at least one lower spindle drive is fastened to the supporting element. It is also possible that the hollow shaft motor is fastened to the supporting element and that the hollow shaft motor drives an axially movable upper spindle of the at least one upper spindle drive rotatively, and that an upper fixed bearing of the at least one upper spindle drive is fastened directly or over an upper transfer element to the upper punch unit and/or that the hollow shaft motor drives an axially movable lower spindle of the at least one lower spindle drive rotatively, and that a lower fixed bearing of the at least one lower spindle drive is fastened directly or over a lower transfer element to the lower punch unit and/or the die assembly. Finally, it is also possible that the hollow shaft motor is fastened directly or over an upper transfer element to the upper punch unit and drives an axially movable upper spindle of the at least one upper spindle drive rotatively, and that an upper fixed bearing of the at least one upper spindle drive is fastened to the supporting element and/or that the hollow shaft motor is fastened directly or over a lower transfer element to the lower punch unit and/or the die assembly and drives an axially movable lower spindle of the at least one lower spindle drive rotatively, and that a lower fixed bearing of the at least one lower spindle drive is fastened to the supporting element. In all cases, the upper or lower transfer element once again can be an upper or lower transfer bridge. Moreover a flexible coupling may be disposed between the electric motor and a spindle of the at least one spindle drive, Alternatively, it is possible that the upper drive unit comprises at least one upper hydraulic or electrohydraulic drive and/or that the lower drive unit comprises at least one lower hydraulic or electrohydraulic drive. It is then furthermore possible that the upper hydraulic drive comprises at least one upper hydraulic cylinder, which is fastened to the supporting element, and that a piston rod of the at least one upper hydraulic cylinder is fastened directly or over an upper transfer element to the upper punch unit and/or that the lower hydraulic drive comprises at least one lower hydraulic cylinder, which is fastened to the supporting element, and that a piston rod of the at least one lower hydraulic cylinder is fastened directly or over a lower transfer element to the lower punch unit and/or the die assembly. It is also possible that the upper hydraulic drive comprises an upper hydraulic cylinder, which is fastened directly or over an upper transfer element to the upper punch unit, wherein a piston rod of the at least one upper hydraulic cylinder is fastened to the supporting element and/or that the lower hydraulic drive comprises at least one lower hydraulic cylinder, which is fastened directly or over a lower transfer element to the lower punch unit and/or the lower die assembly, wherein a piston rod of the at least one lower hydraulic cylinder is fastened to the supporting element. Once again, the upper or lower transfer element can be an upper or lower transfer bridge.

Basically, it is conceivable that the supporting element is constructed in several parts. For the supporting element, a closed or open profile is possible. For example, the supporting element may have two separate side parts with, in each case, one or more recesses and/or one or more struts. In accordance with a preferred development, the supporting element is formed in one piece. This decreases manufacturing tolerances. According to a further development in this regard, the supporting element may have a U shape, which lies in a plane, which is oriented perpendicularly to the longitudinal axis of the press, and particularly in a horizontal plane. With such a development, the areas of the supporting element, which determine the relevant tolerances of the components, can be produced particularly precisely. In order to increase the stability of the U shape during the operation of the press, the legs of the U-shaped supporting elements can be connected by a detachable strut.

According to a further development, the tool guiding unit can form a module, which can be removed from the press as a whole and can be exchanged for a different tool guiding unit, which also forms a module. For this development, the tool guiding unit forms a so-called adapter, which can be removed from the press frame as a whole and exchanged for a different tool guiding unit, for example, in the case of wear or a change to a different combination of die assembly and punch unit. It is particularly easy to remove the tool guiding unit, since, according to the invention, the respective drive unit is supported at the supporting element of the press frame and the tool guiding unit, contrary to what is the case in the prior art, is not penetrated by guiding bars and spindles of the drive unit, which are firmly connected with the press frame.

BRIEF DESCRIPTION OF THE SEVERAL VIEWS OF THE DRAWINGS

FIG. 1 diagrammatically shows the inventive press in a perspective view.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

An example of the invention is explained in greater detail in the following by means of a drawing. The single FIGURE diagrammatically shows an inventive press in a perspective view. The inventive press has a press frame 10 with an upper retaining plate 12 and a lower retaining plate 14. In the example shown, the upper and the lower retaining plates 12, 14 are connected with one another over four spacers 16, which extend in the vertical direction and with a supporting element 18, which is disposed approximately centrally between the upper and lower retaining plates 12, 14. In the example shown, the supporting element 18 is constructed in one piece and has a U-shaped profile, which lies in a horizontal plane, a mounting plane or an extending plane. The lower retaining plate 14 rests on four supporting legs 20 on the ground. Moreover, the inventive press has a tool guiding unit being constructed as a module, with an upper punch unit which may consist of an upper punch plate 22 with an upper punch, which is not shown, a lower punch unit, which may consist of a lower punch plate 24 with a lower punch, which is not shown, as well as a die plate 26, which is disposed between the upper punch plate 22 or the upper punch unit and the lower punch plate 24 or the lower punch unit, the die plate 26 having a holder, which is not shown, for powder, for example metal powder or ceramic powder, which is to be pressed by the upper punch and the lower punch. In the example shown, the upper punch plate 22, the lower punch plate 24 and the die plate 26 are connected with one another over four vertical guiding pillars 28. In the example shown, the retaining plate 26 is connected directly with the supporting element 18. The tool-guiding unit 22, 24, 26, 28 can be removed as a whole from the press frame 10 and exchanged for a different tool guiding unit.

Moreover, the inventive press comprises two upper drive units for moving the upper punch plate 22 vertically and two lower drive units for moving the lower punch plate 24 vertically. The upper and lower drive units are disposed on two opposite sides of the press frame 10. The upper drive units each comprise an upper electric motor 30, which is disposed on the upper retaining plate 12, and an upper spindle drive. In the example shown, an upper fixed bearing 32 of the upper spindle drive is fastened directly to the upper side of the supporting element 18. However, it can also be fastened to the underside. The electric motors 30 drive an axially stationary upper spindle 34 rotatively. On each of the upper spindles 34, an upper spindle nut 36 is disposed axially movably. When the upper spindles 34 are driven rotatively, the respective upper spindle nut 36 is moved axially. The upper spindle nuts 36 of the upper drive units are fastened to an upper transfer bridge 38, which is connected over an upper force transferring element 40 with the upper punch plate 22. An axial movement of the upper spindle nuts 36 is transferred in this manner to the upper punch plate 22, so that the latter is also moved in the axial direction.

In this respect, the construction of the lower drive units is identical. For example, each of the lower drive units has an electric motor 42, which is disposed on the lower retaining plate 14 and in each case drives an axially stationary lower spindle 44, in each case a lower fixed bearing 46 of the lower spindle drives being fastened directly to the underside of the supporting element 18. The fixed bearing 46 may also be fastened to the upper side. Once again, a lower spindle nut 50 is disposed on each lower spindle 44. The lower spindle nuts 50 once again are connected with a lower transfer bridge 52, which is connected over a lower force transfer element 54 with the lower punch plate 24. When the lower electric motors 42 drive the lower spindle 44 rotatively, there is, once again, an axial movement of the lower spindle nuts 50, which is transferred over the lower transfer bridge 52 and the lower force transfer element 54 to the lower punch plate 24, so that the latter is also moved in the axial direction.

It can be seen that the upper drive units are respectively supported over their upper fixed bearing 32 and the lower drive units over their lower fixed bearing 46 directly at the supporting element 18. Therefore, during a pressing process, a force flows between the upper punch into the upper punch plate 22, from this over the upper force transfer element 40 and the upper transfer bridge 38 into the two upper drive units, in particular the upper spindles 34 and the upper fixed bearings 32 and, from these, into the supporting element 18. Correspondingly, a force flows from the lower punch into the lower punch plate 24 and over the lower force transfer element 54 and the lower transfer bridge 52 into the lower drive units, in particular the lower spindles 44 and the lower fixed bearings 46 and, from these, once again into the supporting element 18. Accordingly, there are comparatively few components in the force flux, so that also correspondingly few component tolerances accumulate. Since the location plane of the supporting element 18 lies in the same horizontal plane as the die plate 26 or in a plane at a slight distance from the latter, and the vertical spacers 16 essentially do not participate in the force flux, the frame spring and, with that, the deformation of the press frame 10 is not appreciable. Moreover, the supporting element 18, which absorbs pressing forces, can be manufactured precisely and with slight tolerances. At the same time, the whole of the tool guiding unit 22, 24, 26, 28 can be exchanged easily in the case of wear or a change in production.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A press for producing a pellet of a powdered material, comprising
    a press frame (10) with an upper and a lower retaining plate (12, 14), which are connected to one another by several vertical spacers (16) and with at least one supporting element (18), which is disposed between the upper and the lower retaining plate (12, 14),
    a tool guiding unit with at least one upper punch unit with at least one upper punch unit with at least an upper press punch and/or with at least one lower punch unit with at least one lower press punch and with a die assembly with at least one holder for the powdered material, which is to be pressed by the upper and/or lower press punches, wherein the tool guiding unit is disposed at the supporting element (18),
    at least one upper drive unit for moving the upper punch unit in the vertical direction and/or at least one lower drive unit for moving the lower punch unit and/or the die assembly in the vertical direction, wherein the upper drive unit and/or the lower drive unit are supported directly at the supporting element (18) during the operation of the press, such that the reaction forces, which are generated by the pressing forces, produced during the pressing of the powdered material in the at least one holder, are generated as action forces, are passed into the supporting element;
    wherein:
    the upper drive unit and/or the lower drive unit are fastened to the supporting element (18);
    the upper drive unit comprises at least one upper spindle drive, which is driven by an electric motor (30), and/or the lower drive unit comprises at least one lower spindle drive, which is driven by at least one electric motor (42);
    at least one electric motor (30) of the upper spindle drive is fastened to the upper retaining plate (12) of the press frame (10) and/or at least one electric motor (42) of the lower spindle drive is fastened to the lower retaining plate (14) of the press frame (10).

2. The press according to claim 1, characterized in that the die assembly and the supporting element (18) of the press frame (10) are disposed in the same location plane or in location planes at a slight distance from one another.

3. The press of claim 1, characterized in that the die assembly is fastened to the supporting element (18).

4. The press of claim 1, characterized in that the upper drive unit and/or the lower drive unit are disposed and/or fastened at the supporting element (18).

5. The press of claim 1, characterized in that the upper drive unit is disposed between the supporting element (18) and the upper punch unit and/or that the lower drive unit is disposed between the supporting element (18) and the lower punch unit or the die assembly.

6. The press of claim 4, characterized in that the upper drive unit is fastened directly or over an upper transfer element to the upper punch unit and/or that the lower drive unit is fastened directly or over a lower transfer element to the lower punch unit or the die assembly.

7. The press according to claim 6, characterized in that the upper transfer element comprises an upper transfer bridge (38), wherein two upper drive units are provided, which are fastened to the upper transfer bridge (38) and/or that the lower transfer element comprises a lower transfer bridge (52), wherein two lower drive units are provided, which are fastened to the lower transfer bridge (52).

8. The press according to claim 7, characterized in that an upper force transfer element (40) is disposed between the upper transfer bridge (38) and the upper punch unit and/or that a lower force transfer element (54) is disposed between the lower transfer bridge (52) and the lower punch unit or the die assembly (54).

9. The press of claim 1, characterized in that an upper fixed bearing (32) of an upper spindle (34) of at least one upper spindle drive is fastened to the supporting element (18) and an upper spindle nut (36) of the at least one upper spindle drive is fastened directly or over an upper transfer element at the upper punch unit and/or that a lower fixed bearing (46) of a lower spindle (44) of at least one lower spindle drive is fastened at the supporting element (18) and a lower spindle nut (50) of the at least one lower spindle drive is fastened directly or over a lower transfer element to the lower punch unit and or the die assembly.

10. The press of claim 1, characterized in that the at least one electric motor (30, 42) is a hollow shaft motor.

11. The press according to claim 10, characterized in that the hollow shaft motor (30, 42) is fastened to the supporting element (18) and that the hollow shaft motor drives an upper spindle nut (36) of the at least one upper spindle drive, wherein an upper spindle (34) of the at least one upper spindle drive is fastened directly or over an upper transfer element to the upper punch unit and/or that the hollow shaft motor drives a lower spindle nut (50) of the at least one lower spindle drive, wherein a lower spindle (44) of the at least one lower spindle drive is fastened directly or over a lower transfer element at the lowest punch unit and/or the die assembly.

12. The press according to claim 10, characterized in that the hollow shaft motor (30, 42) is fastened directly or over an upper transfer element to the upper punch unit and drives an upper spindle nut (36) of the at least one upper spindle drive, and that an upper spindle (34) of the at least one upper spindle drive is fastened to the supporting element (18) and/or that the hollow shaft motor is fastened directly or over a lower transfer element to the lower punch unit and/or the die assembly and drives a lower spindle nut (50) of the at least one lower spindle drive, and that a lower spindle (44) of the at least one lower spindle drive is fastened to the supporting element (18).

13. The press according to claim 10, characterized in that the hollow shaft motor (30, 42) is fastened to the supporting element (18) and that the hollow shaft mortar drives an axially movable upper spindle (34) of the at least one upper spindle drive rotatively, and that an upper fixed bearing (32) of the at least one upper spindle drive is fastened directly or over an upper transfer element to the upper punch unit and/or that the hollow shaft motor drives an axially movable lower spindle (44) of the at least one lower spindle drive rotatively, and that a lower fixed bearing (46) of the at least one lower spindle drive is fastened directly or over a lower transfer element to the lower punch unit and/or the die assembly.

14. The press according to claim 10, characterized in that the hollow shaft motor (30, 42) is fastened directly or over an upper transfer element to the upper punch unit and drives an axially movable upper spindle (34) of the at least one upper spindle drive rotatively, and that an upper fixed bearing (32) of the at least one upper spindle drive is fastened to the supporting element (18) and/or that the hollow shaft motor is fastened directly or over a lower transfer element to the lower punch unit and/or the die assembly and drives an axially movable lower spindle (44) of the at least one lower spindle drive rotatively, and that a lower fixed bearing (46) of the at least one lower spindle drive is fastened to the supporting element (18).

15. The press according to claim 1, characterized in that the upper drive unit comprises at least one upper hydraulic or electrohydraulic drive and/or that the lower drive unit comprises at least one lower hydraulic or electrohydraulic drive.

16. The press according to claim 15, characterized in that the upper hydraulic drive comprises at least one upper hydraulic cylinder, which is fastened to the supporting element (18), and that a piston rod of the at least one upper hydraulic cylinder is fastened directly or over an upper transfer element to the upper punch unit and/or that the lower hydraulic drive comprises at least one hydraulic cylinder, which is fastened to the supporting element (18), and that a piston rod of the at least one lower hydraulic cylinder is fastened directly or over a lower transfer element to the lower punch unit and/or the die assembly.

17. The press according to claim 15, characterized in that the upper hydraulic drive comprises at least one upper hydraulic cylinder, which is fastened directly or over an upper transfer element to the upper punch unit, wherein a piston rod of the at least one upper hydraulic cylinder is fastened to the supporting element (18) and/or in that the lower hydraulic drive comprises at least one lower hydraulic cylinder, which is fastened directly or over a lower transfer element to the lower punch unit, wherein a piston rod of the at least one lower hydraulic cylinder is fastened to the supporting element (18).

18. The press of claim 1, characterized in that the supporting element (18) is constructed in one piece.

19. The press of claim 1, characterized in that the supporting element (18) has a U shape, which lies in a plane, which is oriented perpendicularly to the longitudinal axis of the press frame (10), in particular in a horizontal plane.

20. The press of claim 1, characterized in that the tool guiding unit forms a module, which can be removed as a whole from the press and exchanged for a different tool guiding unit, which also forms a module.

21. A press for producing a pellet of a powdered material, comprising
a press frame (10) with an upper and a lower retaining plate (12, 14), which are connected to one another by several vertical spacers (16) and with at least one supporting element (18) disposed essentially in the middle between the retaining plates, which is disposed between the upper and the lower retaining plate (12, 14),
a tool guiding unit with at least one upper punch unit with at least one upper punch unit with at least an upper press punch and/or with at least one lower punch unit with at least one lower press punch and with a die assembly with at least one holder for the powdered material, which is to be pressed by the upper and/or lower press punches, wherein the tool guiding unit is disposed at the supporting element (18),
at least one upper drive unit for moving the upper punch unit in the vertical direction and/or at least one lower drive unit for moving the lower punch unit and/or the die assembly in the vertical direction, wherein the upper drive unit and/or the lower drive unit are supported directly at the supporting element (18) during the operation of the press, such that the reaction forces, which are generated by the pressing forces, produced during the pressing of the powdered material in the at least one holder, are generated as action forces, are passed into the supporting element;
wherein:
the upper drive unit and/or the lower drive unit are fastened to the supporting element (18);
the upper drive unit comprises at least one upper spindle drive, which is driven by an electric motor (30), and/or the lower drive unit comprises at least one lower spindle drive, which is driven by at least one electric motor (42);
at least one electric motor (30) of the upper spindle drive is fastened to the upper retaining plate (12) of the press frame (10) and/or at least one electric motor (42) of the lower spindle drive is fastened to the lower retaining plate (14) of the press frame (10).

22. A press for producing a pellet of a powdered material, comprising
a press frame (10) with an upper and a lower retaining plate (12, 14), which are connected to one another by several vertical spacers (16) and with at least one supporting element (18), which is disposed between the upper and the lower retaining plate (12, 14),
a tool guiding unit with at least one upper punch unit with at least one upper punch unit with at least an upper press punch and/or with at least one lower punch unit with at least one lower press punch and with a die assembly with at least one holder for the powdered material, which is to be pressed by the upper and/or lower press punches, wherein the tool guiding unit is disposed at the supporting element (18),
at least one upper drive unit for moving the upper punch unit in the vertical direction and/or at least one lower drive unit for moving the lower punch unit and/or the die assembly in the vertical direction, wherein the upper drive unit and/or the lower drive unit are supported directly at the supporting element (18) during the operation of the press, such that the reaction forces, which are generated by the pressing forces, produced during the pressing of the powdered material in the at least one holder, are generated as action forces, are passed into the supporting element;
wherein:
the upper drive unit and/or the lower drive unit are fastened to the supporting element (18);
the upper drive unit comprises at least one upper spindle drive, which is driven by an electric motor (30), and/or the lower drive unit comprises at least one lower spindle drive, which is driven by at least one electric motor (42);
at least one electric motor (30) of the upper spindle drive is fastened to the upper retaining plate (12) of the press frame (10) and/or at least one electric motor (42) of the lower spindle drive is fastened to the lower retaining plate (14) of the press frame (10);
wherein the die assembly and the supporting element (18) of the press frame (10) are disposed in the same location plane or in location planes at a slight distance from one another.

23. A press for producing a pellet of a powdered material, comprising
a press frame (10) with an upper and a lower retaining plate (12, 14), which are connected to one another by several vertical spacers (16) and with at least one supporting element (18), which is disposed between the upper and the lower retaining plate (12, 14), a tool guiding unit with at least one upper punch unit with at least one upper punch unit with at least an upper press punch and/or with at least one lower punch unit with at least one lower press punch and with a die assembly with at least one holder for the powdered material, which is to be pressed by the upper and/or lower press punches, wherein the tool guiding unit is disposed at the supporting element (18), at least one upper drive unit for moving the upper punch unit in the vertical direction and/or at least one lower drive unit for moving the lower punch unit and/or the die assembly in the vertical direction, wherein the upper drive unit and/or the lower drive unit are supported directly at the supporting element (18) during the operation of the press, such that the reaction forces, which are generated by the pressing forces, produced during the pressing of the powdered material in the at least one holder, are generated as action forces, are passed into the supporting element;

wherein:

the upper drive unit and/or the lower drive unit are fastened to the supporting element (18);

the upper drive unit comprises at least one upper spindle drive, which is driven by an electric motor (30), and/or the lower drive unit comprises at least one lower spindle drive, which is driven by at least one electric motor (42);

at least one electric motor (30) of the upper spindle drive is fastened to the upper retaining plate (12) of the press frame (10) and/or at least one electric motor (42) of the lower spindle drive is fastened to the lower retaining plate (14) of the press frame (10);

wherein the supporting element (18) has a U shape, which lies in a plane, which is oriented in a horizontal plane perpendicularly to the longitudinal axis of the press frame (10).

* * * * *